United States Patent [19]
Bonzi

[11] Patent Number: 6,003,026
[45] Date of Patent: Dec. 14, 1999

[54] EMULATOR FOR AN SQL RELATIONAL-DATABASE

[75] Inventor: Rodolfo Bonzi, Milan, Italy

[73] Assignee: Alcatel N.V., Rijswijk, Netherlands

[21] Appl. No.: 08/983,200

[22] PCT Filed: Jul. 13, 1996

[86] PCT No.: PCT/EP96/03080

§ 371 Date: May 4, 1998

§ 102(e) Date: May 4, 1998

[87] PCT Pub. No.: WO97/04407

PCT Pub. Date: Feb. 6, 1997

[30] Foreign Application Priority Data

Jul. 14, 1995 [IT] Italy ................................. MI95A1510

[51] Int. Cl.$^6$ ................................................ G06F 17/30
[52] U.S. Cl. ................................. 707/4; 707/4; 707/101; 707/2
[58] Field of Search ....................... 707/4, 101, 2

[56] References Cited

U.S. PATENT DOCUMENTS

| | | | |
|---|---|---|---|
| 4,205,371 | 5/1980 | Feather | 364/200 |
| 5,553,218 | 9/1996 | Li et al. | 395/148 |
| 5,640,550 | 6/1997 | Coker | 395/604 |
| 5,717,911 | 2/1998 | Madrid et al. | 395/602 |

FOREIGN PATENT DOCUMENTS

| | | |
|---|---|---|
| 0560543 | 9/1993 | European Pat. Off. . |
| 8904013 | 5/1989 | WIPO . |

*Primary Examiner*—Thomas G. Black
*Assistant Examiner*—William Trinh
*Attorney, Agent, or Firm*—Ware, Fressola, Van Der Sluys & Adolphson LLP

[57] ABSTRACT

Method and means for porting an existing application (An) using a relational-database with SQL interface toward a hardware platform (HW2) with a reduced software configuration which does not include an SQL relational-database. The invention emulates an SQL database enabling hardware resources saving and providing a subset of functions for: creating SQL tables and defining fields; storing, modifying and deleting data on created tables, with a type check, retrieving such data by using SQL filters. Functions can be subdivided into levels (M1, M2, M3) in order to: convert an SQL statement, coming from an existing user application (An), into a sequence of elementary interface functions (IF1 ... IFn), use said interface functions to read/write data files (F1 ... Fn), process output data to be supplied to the requesting user application (An).

8 Claims, 6 Drawing Sheets

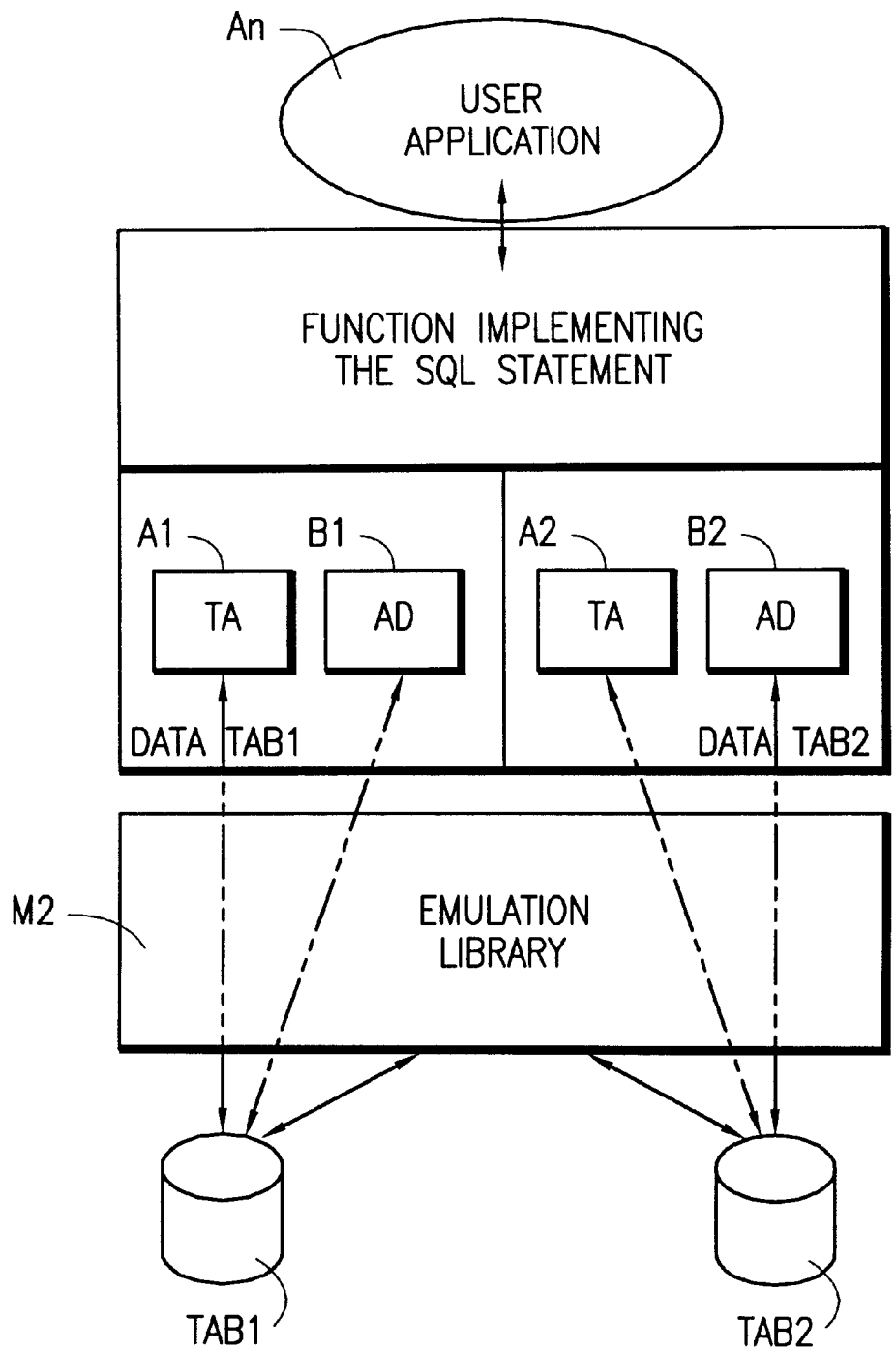
FIG. 4-B

EMULATOR FOR AN SQL RELATIONAL-DATABASE

BACKGROUND OF THE INVENTION

1. Technical Field

The present invention relates to a method of providing a subset of SQL (Structured Query Language) relational-database functions to existing applications.

2. Discussion of Related Art

There still exist a variety of commercially available databases with SQL interface, providing an exhaustive set of functions, but they are highly hardware resource consuming.

As a result, computer programs written for one computer with a software platform including a commercial SQL relational-database are frequently unsuitable for use with computers having a reduced hardware configuration.

In the past many existing applications had to be rewritten in order to enable them to interface with a proprietary database resident on that equipment.

Furthermore proprietary databases are usually equipment dependent and cannot be used for the same or other applications on other equipment.

One of the major problems that application developers are faced with when porting existing applications, developed on a different hardware and software platforms and using an SQL relational-database, toward equipment with reduced hardware configuration, for example communication servers, other network apparatus etc., is the need to rewrite part of the applications in order to enable them to interface with a proprietary database resident on that equipment, otherwise the applications could not be used or must be rewritten completely. Sometimes the destination equipment has a reduced availability of hardware resources because of the installation of other resource consuming applications (e.g., communication software like ISO/OSI stack protocols, TCP/IP and others) and since commercial SQL relational-databases are highly hardware resources consuming it could be desirable to avoid installing it, for example in the case of the porting of an application toward one or more communication servers.

It will be recognized that an SQL database running on any equipment with any configuration is essential in order to allow an existing application using an SQL database to be ported toward an equipment and to function correctly, when a commercial database has not been installed.

SUMMARY OF INVENTION

It is an object of the present invention to provide a method and means of porting/supplying a set of SQL database functions to an existing application on any equipment, without a significant consumption of hardware resources.

The object is attained by methods with the features according to claim 1 or claim 5 and by means according to claim 7.

The invention as claimed enables the porting of existing user software applications using an SQL database toward any reduced hardware configuration on which a commercial resource consuming SQL relational-database cannot be installed, by only copying, recompiling and executing the application files, without any source code modification.

By using the invention, the waste of time to modify existing source code is avoided, where sometimes such source code is not easily modifiable and would require a big effort.

Furthermore, it is sometimes preferable to save hardware resources for other run time applications, in these cases the emulator object of the invention enables the saving in a configuration phase.

Furthermore, the emulator can be customized to be used with different platforms on any different equipment.

Further advantageous features of the invention are defined in the subclaims.

Advantageously, security of user data can be guaranteed, when necessary, by using an encryption/decryption module to access data files.

BRIEF DESCRIPTION OF THE DRAWINGS

The invention will now be described in detail, by way of example, with reference to the accompanying drawings, in which:

FIG. 4-B shows a special example of FIG. 4;

DETAILED DESCRIPTION OF PREFERRED EMBODIMENTS

Figure 1:
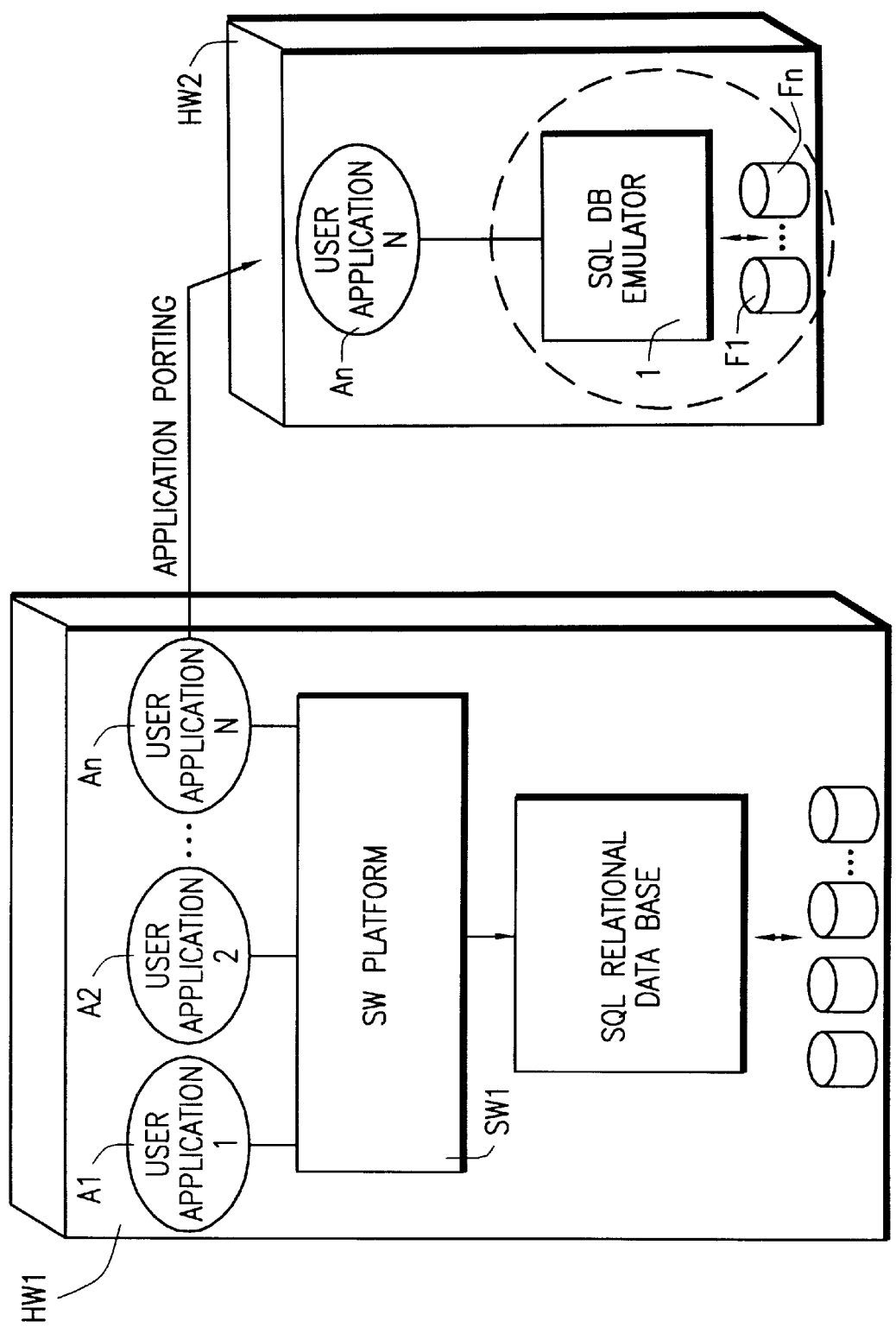
FIG. 1 shows the use of the emulator during a porting phase.

This invention focuses on a database emulation approach, as shown in FIG. 1. In what follows, particular attention will be paid to the service provided to the application needing the database though it should be understood that emulator might implement a different set of functions which will be the minimum required by the application in order to work.

With the present invention an original method to provide the performances of an SQL commercial database in a different way is given, by using an emulator 1.

Said emulator is a modular database: only the functions needed to satisfy the requirements of an existing user application An are configured and installed, so to enable the maximum flexibility in order to reduce the consumption of hardware resources, in particular memory and CPU time.

The emulator manages configuration and user data ASCII files F1 . . . Fn by using a modular library of functions and predefined data structures. The simple modular structure enables an easy configuration upgrade and maintenance, in order to reduce the emulator size taking into consideration the application requirements and the hardware configuration of an equipment.

Said application An has, for example, been developed on a first hardware platform HW1 interfacing the application An toward the SQL relational database with a software configuration SW1, and it is supposed to be used on a second hardware platform HW2 where the SQL database is not available and thus SW1 is not usable.

Figure 2:
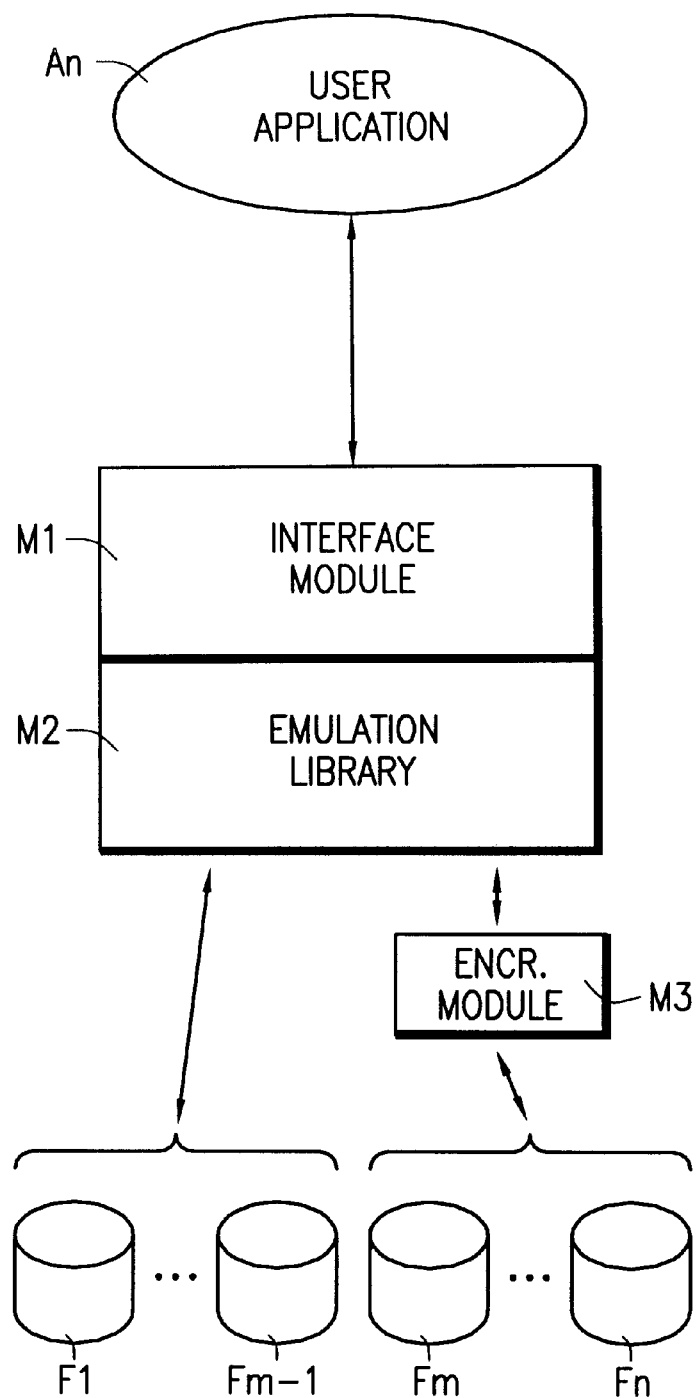
FIG. 2 enumerate all parts which make up the software architecture of the emulator.

The software architecture of the emulator 1 is shown in FIG. 2.

The emulator 1 is composed of the following parts:

an Interface Module M1 providing the applications with an SQL interface (it takes the place of the SW1 platform). This module is application dependent and should be customized depending on the type of SQL statements used, with particular regard to query statement having a complex syntax. It includes a set of functions, one for each specific SQL statement used by the application An;

a modular Emulation Library M2, expandable and application independent, including a set of functions performing basic operations on the ASCII files, invoked by M1 in order to implement the SQL statements used by the application An;

an error management module (not shown in the figure);

an Encryption Module M3 (not mandatory);

configuration ASCII files including the database and tables definition F1 . . . Fm−1; and ASCII user data files Fm . . . Fn (which can be encrypted) including the user data inserted according to the tables definition.

The emulator manages a number of ASCII files containing the tables definition and the user applications data.

For security reasons data can optionally be encrypted.

Using the emulator, the CPU time dedicated and the amount of RAM memory and hard disk number of Mbytes required is highly reduced, compared to existing SQL databases.

Figure 3:
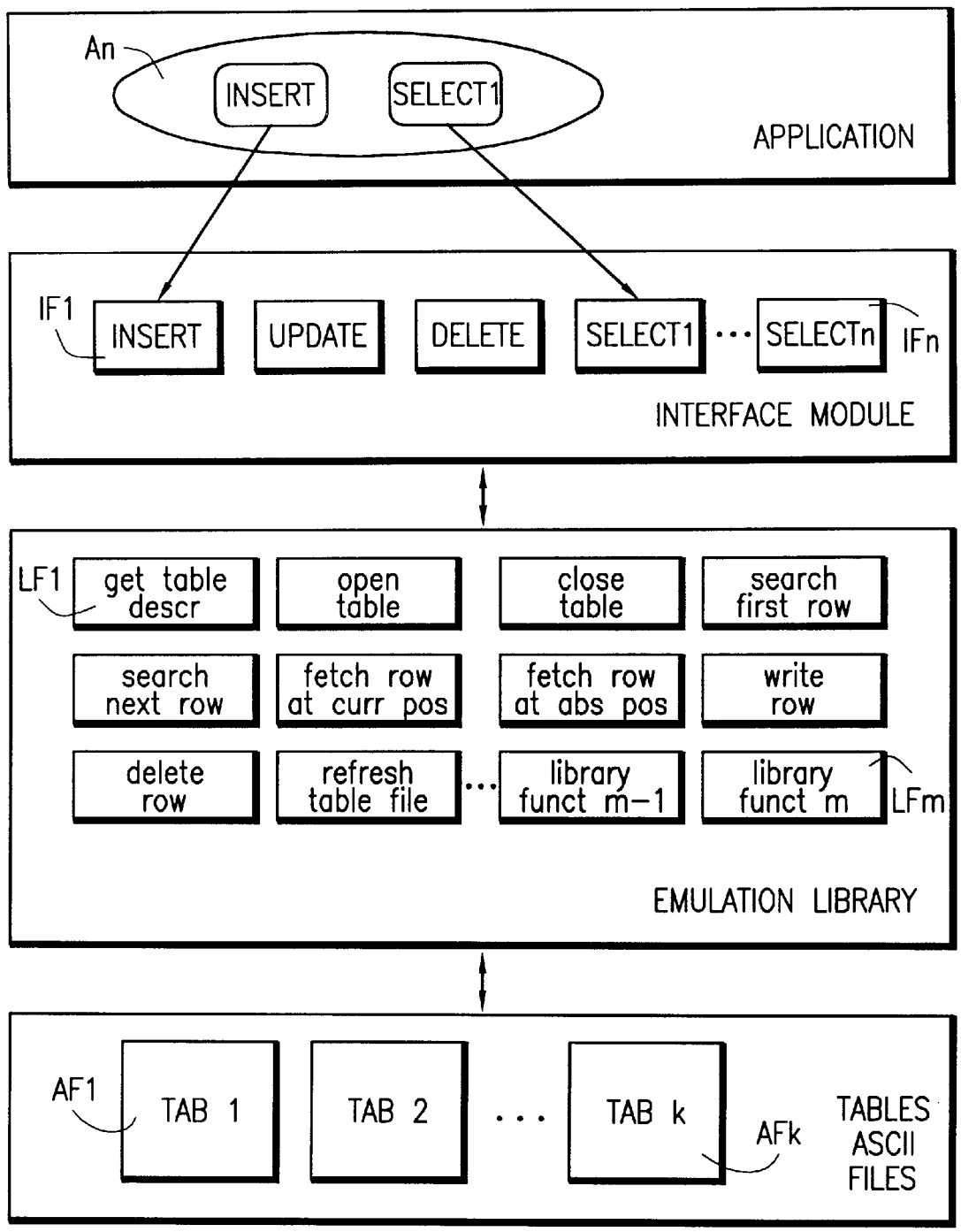
FIG. 3 shows how an SQL statement is converted into an interface function which is then translated into a sequence of emulation library functions accessing the ASCII files.

The SQL relational-database emulator provides the user applications with a modular library including a set of functions to:

creating SQL tables and defining fields;

storing, modifying and deleting data on created tables, where a type check is performed according to the field definition; and retrieving such data by using SQL filters;

The emulator implements the SQL commands in two different ways:

1. to define the database structure, the following table configuration commands can be implemented by using an editor to update configuration files:
   x create table
   x modify table configuration
   x drop table
   x description
   . insert row to pre-populate the table
2. to use the defined database, the run-time modification of table content is realized by using the Module Interface functions IF1 . . . IFn, as shown in FIG. 3:
   select rows;
   insert one row;
   delete rows;
   update one row.

This description will continue to take as an example an SQL database whose services are to be emulated.

Before proceeding to a detailed description of the invention, it would be helpful to outline certain relevant aspects of the tables configuration phase.

It will be described in the manner in which the following SQL statements are handled:

create table (II), modify table configuration (alter/drop/create)(I, III, II), delete (alter/drop)(I, III), description (IV)

insert row to pre-populate the table (V).

The SQL syntax of the aforesaid statements is the following:

I) to modify a database:
   ALTER DATABASE database_name;
II) to define a new table structure:
   CREATE TABLE table_name (field_name1 NUMBER (9),
   field_name2 CHAR (14));
III) to delete a table:
   DROP TABLE table_name
IV) to see the table definition:
   DESC table_name
V) data inserted as default:
   INSERT INTO table_name (field_name1, field_name2) VALUES ('field_value1', 'field_value2');

The aforesaid mentioned SQL statements can be emulated by using an ASCII configuration file written and modified by using an editor.

For each new table an ASCII file is created.

Each row defines a column of the table.

The following is an example of table on an emulator table configuration ASCII file, where the first part is the table structure definition and the second part is the user data inserted as default.

The characters "¦", "-" and "*" are used to divide data.

The character "#" indicates that there is a comment line.

In the first part the table structure is defined.

The data included between H . . . H represents the table definition, and each row starting with a C is a column of the defined table.

The specified parameters define for each table column the:

x type, x length, x if the field can be null, x if the field is a unique index to access to the records.

In the second part of this example, rows with data are inserted into the table.

A type check is performed according to the previous table definition.

```

# Table ASH_STATES

H This table has 4 columns¦4¦

C Application Service Id.   ¦NUMBER¦3¦NOT NULL¦UNIQUE INDEX¦
C Appiication Entity Name  ¦CHAR¦32¦NOT NULL¦UNIQUE INDEX¦
C Sequence Number          ¦NUMBER¦3¦NOT NULL¦UNIQUE INDEX¦
C StateName                ¦CHAR¦20¦NOT NULL¦
H

* 1¦dh_1¦   0¦IDLE¦
* 1¦dh_1¦   1¦START_INT_DIAL_PEND ¦
* 1¦dh_1¦   2¦INT_DIAL_EXP ¦
* 1¦dh_1¦   3¦INT_DIAL_PEND ¦
* 1¦dh_1¦   4¦WAIT_FOR_CONT ¦
* 1¦dh_1¦   5¦WAIT_FOR_LAST ¦
* 1¦dh_1¦998¦PROVIDER_ABORT ¦
* 1¦dh_1¦999¦SUCCESFUL_COMPLETED ¦

* 2¦bh_1¦   0¦IDLE ¦
* 2¦bh_1¦   1¦COMMAND_EXPECTED ¦
* 2¦bh_1¦998¦PROVIDER_ABORT ¦
* 2¦bh#1¦999¦SUCCESFUL COMPLETED ¦

```

The skilled man will be aware of still further configuration mode.

By way of further explanation, reference is directed to FIG. 3 which is in diagrammatic form.

An SQL statement, included in the user application, cause the activation of an emulator interface functions IFi, which invokes a sequence, depending on the specific SQL statement, of emulation library functions LF1 . . . LFm accessing the ASCII files AF1 . . . AFk containing the user data.

For example when the SQL statement INSERT INTO Tab2 (field_name1,field_name2) VALUES ('field_value1', 'field_value2'); is invoked by the user application An, the INSERT emulator interface function IF1 is activated; it calls a sequence of emulation library functions accessing the Tab2 ASCII file AF2 containing the user data, as it will be explained in more detail later.

Another example is the following: when the SQL statement SELECT FROM Tab2 is invoked by the user application An, the SELECTn emulator interface function IFn is activated; it calls a sequence of emulation library functions accessing the Tab2 ASCII file.

A modular emulation library is available providing a set of functions LF1 . . . LFm.

A subset of said functions can be combined to implement an SQL statement.

An example of library functions is the following:

| F1 | _get_table_descr |
|---|---|
| F2 | _open_table |
| F3 | _close_table |
| F4 | _search_first_row |
| F5 | _search_next_row |
| F6 | _fetch_row_at_curr_pos |
| F7 | _fetch_row_at_abs_pos |
| F8 | _write_row |
| F9 | _delete_row |
| F10 | _refresh_table_file |

A detailed description of each function is provided later.

Figure 4:
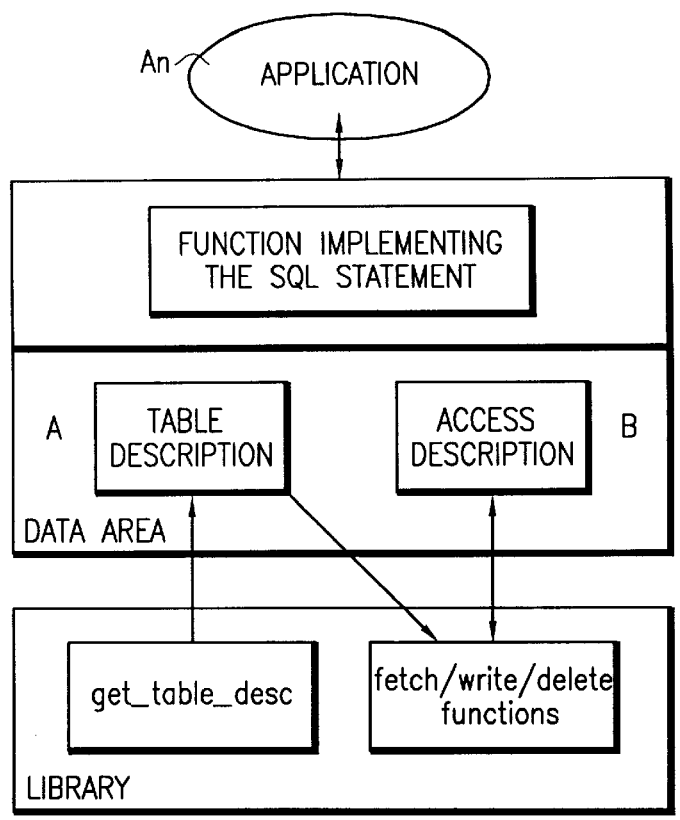
FIG. 4 shows the implementation of how an SQL statement is converted into an interface function which is then translated into a sequence of emulation library functions accessing the ASCII files.

In FIG. 4 it is shown in details the implementation of one of the interface functions IF1 . . . IFn aforesaid listed and shown in FIG. 3.

Said function is translated into a sequence of emulation library functions LF1 . . . LFm accessing the ASCII files.

Table Description A and Access Description B are defined in the data area of the function IFi; they are implemented as an array of records having an element for each database table column.

Table Description A is a build up of the following configuration data:
1=column type,
2=column length,
3=whether the field can be null or not,
4=whether the field is an index to access to the records or not.

Access description B includes data about the access type and mode depending on the origin SQL statement type.

It is a build up of the following data, filled in by the emulator Interface Function IFi depending on which columns the SQL statement uses:
1=use flag to indicate if the column is used (T=true, F=false)
2=string size,
and the following fields where to read/write the result of the operation (written by the _fetch_row or read by the _write_row):
3=a flag indicating whether the field can be null or not (T=true, F=false),
4=a flag indicating whether the field contains a numeric value,
5=a flag indicating whether the field contains an alphanumeric value (char=character/ptr=pointer).

The first operation performed in RAM memory is the _get_table_description function activation to retrieve from the database files the user table definition and copy it in the Table Description A. Subsequently all the emulator library functions will use the Table Description A to read/write the Access Description B.

Figure 5:
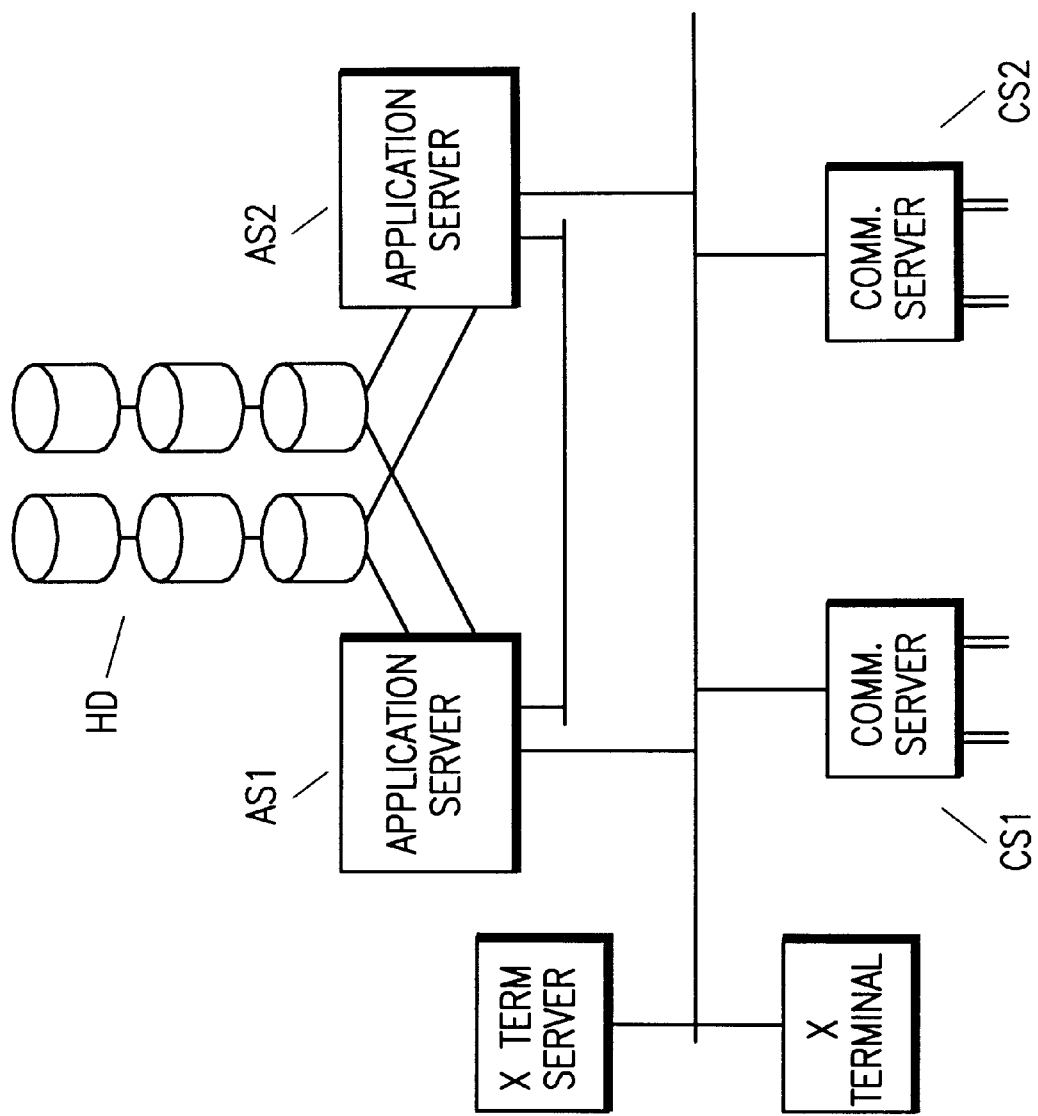
FIG. 5 shows a system for managing a telephone network, implemented using a LAN network comprising communication servers of reduced hardware configuration which can carry out the invention.

An example of a system to manage a telephone network, implemented using a LAN network comprising communication servers of reduced hardware configuration which can carry out the invention, is shown in FIG. 5. The system includes two Application Servers AS1 and AS2, one active and the other stand-by, performing management operations for a network; these equipment have a full hardware and software configuration including duplicated disks HD.

An Operator can interface the management system by using a so-called X_Terminal connected to a X_Terminal Server providing a graphical operator interface.

A plurality of possible Communication Servers CS1 . . . CSn of reduced hw configuration are installed and can carry out the invention. The number of communication servers CS1 . . . CSn with different hardware configuration can increase in future upgrades of the network. On the communication server CS should be installed applications developed on different hardware configuration equipment having a complete software platform including a commercial database. As the reduced communication server CS software platform should include also communication software and since commercial SQL relational-databases are highly hardware resources consuming, the emulation approach enables to spare memory and CPU time.

An example of a telephone network management system architecture comprising network management systems according to FIG. 5, including equipment which can carry out the invention.

The emulator approach can be useful in view of future extension of the network by inserting an increasing number of equipment of different hardware configuration on which applications needing an SQL relational-database should be executed.

As the complexity of a network topology increases, the network management systems are supposed to be upgraded in terms of number of equipment installed in applications running on said equipment.

The architecture of the network management system shown in FIG. 5 can be split up in a plurality of cooperating sub-systems interconnected through a network.

Network management systems SYSTEM1 SYSTEM2 and SYSTEM3 including equipment having different configuration are interconnected to a network to be managed in order to cooperate exchanging management information.

The emulation approach enables the porting of applications developed on full hardware and software platforms toward any network equipment.

It has been mentioned above that every interface function IF1 . . . IFn aforesaid listed and shown in FIG. 3, is translated into a sequence of emulation library functions LF1 . . . LFm accessing the ASCII files.

By way of further explanation, an SQL statement in the user application is converted into a IF function each IF function is associated to a sequence of functions of the emulation library, where the sequence depends from the SQL statement the output of the SQL command is returned to the user application, as described above.

In the following will be examined in more detail:
1) IF functions
2) emulation library
3) ASCII files An example of set of IF functions can be the following:
insert;
delete;
update;
select1; . . . ; and
selectn.

A SELECT statement, according to SQL syntax, can have a different WHERE clause. Here are some examples of different complexity. The character "*" means "ALL".

```
SELECT f1, f2 FROM tab1;
SELECT*FROM tab1;
SELECT f1, f5 FROM tab1 WHERE (f1=0 AND f2='string');
SELECT f1, f5 FROM tab1
    WHERE (F1=0 AND f2 NOT IN
        (SELECT f3, f4 FROM tab2
            WHERE (f1=10 AND f2='String1')));
((SELECT f1, f5 FROM tab1
    WHERE (F1=0 AND f2 NOT IN
        (SELECT f3, f4 FROM tab2 WHERE (f1=10 AND
            f2='string1')))
)
UNION
(SELECT f1, f5 FROM tab1
    WHERE (F1=0 AND f2 NOT IN
        (SELECT f3, f4 FROM tab2 WHERE (f1=10 AND
            f2='string1')));
)
);
```

The user application An interfaces the database using SQL statement and passing parameters (pointers to data structure containing data sent to the database and pointers to data structure in which the output of the SQL commands will be returned).

There will be described one of the aforesaid IF function, the one correspondent to the SELECT SQL statement, as far as its implementation is concerned.

TAB1 is an example of database table having 6 columns defined C1 . . . C6.

Two data lines have been inserted in TAB1; only the data relevant for the example are written, the other field can have any value. TAB1:

| C1 | C2 | C3  | C4  | C5     | C6 |
|----|----|-----|-----|--------|----|
| 5  |    | 70  | 0   | string |    |
| 10 |    | 100 | 200 | string |    |

The following SQL statement can come from the user application An: SELECT c2, c4, c5 FROM tab1 WHERE (c2=10 AND c6='string');

There will be described how the emulator works to get results.

In this SELECT statement with this WHERE clause, the Access Description Table B defined in FIG. 4, is duplicated in
Access Description Select B1 (not shown in figure),
Access Description Where B2 (not shown in figure).

In this case two different accesses to user data are made by using two Access Description tables. As explained before, every row of the Table Description A and Access Description B or B1 and B2 corresponds to a column of the defined database table at the creation phase.

The Access Description Select B1 defines which fields among C1 . . . C6 are to be retrieved for each data row selected from the ones present in TAB1 and should be sent to the application An, by tagging with T the fields of interest, in this case c1, c4, c5:

|    | 1   | 2 | 3 | 4   | 5 |
|----|-----|---|---|-----|---|
|    | use |   |   |     |   |
| C1 | F   |   |   |     |   |
| C2 | T   |   |   | 10  |   |
| C3 | F   |   |   |     |   |
| C4 | T   |   |   | 100 |   |
| C5 | T   |   |   | 200 |   |
| C6 | F   |   |   |     |   |

The Access Description Where B2 defines the clause to identify which rows present in TAB1 should be selected, by tagging with T the fields cited in the WHERE (c2=10 AND c6='string') clause:

|    | 1   | 2 | 3 | 4  | 5      |
|----|-----|---|---|----|--------|
|    | use |   |   |    |        |
| C1 | F   |   |   |    |        |
| C2 | T   |   |   | 10 |        |
| C3 | F   |   |   |    |        |
| C4 | F   |   |   |    |        |
| C5 | F   |   |   |    |        |
| C6 | T   | 5 |   |    | string |

Another solution in a different SELECT statement, for example SELECT f1,f2 FROM tab1; could be performed by using a single access and a single Access Description B. In FIG. 4-B is shown a special case of FIG. 4. This is the case of the implementation of the following SQL statement.

```
((SELECT f1,f5 FROM tab1
    WHERE (F1=0 AND f2 NOT IN
        (SELECT f3, f4 FROM tab 2 WHERE (f1=10 AND
            f2='string1')))
)
UNION
(SELECT f1,f5 FROM tab1
    WHERE (F1=0 AND f2 NOT IN
        (SELECT f3,f4 FROM tab2 WHERE (f1=10 and f2=
            'string'))));
)
);
``` which could be performed by using:
a multiple Table Description A1 and A2
a multiple Access Description B1 and B2.

In the following paragraph it will be explained how different steps are executed by the IFn SELECT function, by calling a definite sequence of emulator library functions.

When the user application An asks the IFn for retrieving data from the database, it sends to the emulator a pointer to a data structure containing parameters of the SQL SELECT statement and at the end of the operation will be given back a pointer to the retrieved data result of the query.

A way for the IFn to perform the aforesaid task is the following:
1) the Table Description A, in the data area of FIG. 4, is initialized according to the table description read from the ASCII file containing the configuration data, by calling the emulator library function __get__table__ descr() LF in particular the array of structure of Table Description A is filled in, one row for each table column;

2) the ASCII file containing user data related to the previously accessed table configuration is opened the function verify whether the file has not been opened before. If the file is opened for the first time:

opens the file moves to the first row by calling the function _search_next_row( ).

If not, a pointer to the file moves to the row by calling _search_next_row( ) and return a pointer to the row, cycling till:

the end of the file, or the specified number of rows has been read;

3) for each row, it reads the row at current position by calling the function _fetch_row_at_curr_pos( ) and verify if the WHERE clause written in B2 is satisfied for that row, in this case the required fields of that user data row are copied in B1 (SELECT Access Description), filling in the last three columns (null, long/int, char/ptr) according to the data type;

4) at the end close the user data table file.

As result of this function, the output of the SELECT clause will be available in the Access Description table (last three columns of B1) and will be returned to the application An.

An example of EMULATION LIBRARY, as listed above, can be the following.

A subset of the functions can be combined to implement an SQL statement. In the following, a more detailed description of each function is given.

F1

NAME: _get_table_descr
DESCRIPTION: It gets the table description for a specified table (input parameter _table_name), filling in the "row description" structure (output parameter _row_desc). The proper table file is opened and closed after the completion of the table description reading. It logs a message when an error occurs.

F2

NAME: _open_table
DESCRIPTION: It opens a table file for a specified table (input parameter _table_name). The file can be opened for read, update or append depending on the specified "action type" (SELECT, DELETE and INSERT as specified by the input parameter _action_type). It gives back to the calling function the pointer to the opened file (output parameter _file_ptr). It logs a message when an error occurs.

F3

NAME: _close_table
DESCRIPTION: It closes a table file for a specified table name (input parameter _table_name). The file pointer is given by the calling function (input parameter _file_ptr). It logs a message when an error occurs.

F4

NAME: _search_first_row
DESCRIPTION: It searches for the first row in a table. That means: the Table Description lines are skipped, as comment lines, till the second Header line (closing the Table Description) is found. It gets from the calling function the file pointer (input parameter_file_ptr) and the table name (input parameter _table_name) that is inserted in the error messages. If the row is correctly found it gives back to the calling function the position of the row in the table file (output parameter _file_pos): it is the position of the line type char. It assumes the initial value of the file pointer is pointing to the first byte of a file line, otherwise the search fails.

Last char got from the file:

first char of the row (when it has been correctly found end-of-file found at the beginning of a line (no rows in the table)

an unexpected line first char an unexpected end-of-file.

It logs a message when an error occurs.

F5

NAME: _search_next_row
DESCRIPTION: It searches for the next row in a table. That means: Table Description lines, if found, are treated as "unexpected lines". It gets from the calling function the file pointer (input parameter _file_ptr) and the table name (input parameter _table_name) that is inserted in error messages. If the row is correctly found, it gives back to the calling function the position of the row in the table file (output parameter _file_pos): it is the position of the line type char. It assumes the initial value of the file pointer is pointing to the first byte of a file line, otherwise the search fails.

Last char got from the file:

first char of the row (when it has been correctly found)

end-of-file found at the beginning of a line (no more rows in the table)

an unexpected line first char an unexpected end-of-file.

It logs a message when an error occurs.

F6

NAME: _fetch_row_at_curr_pos
DESCRIPTION: It fetches a table row starting from the current position in the table file (position given by the calling function in the file pointer _file_ptr). To scan the row it uses the row description given by the calling function in the input parameter _row_desc. It fills in the "access structure" in the memory area of the calling function (parameter _row_access). For more details, See the internal function _fetch_row. It logs a message when an error occurs.

F7

NAME: _fetch_row_at_abs_pos
DESCRIPTION: It fetches a table row starting from the position explicitly given by the calling function with the input parameter _file_pos (in addition to the file pointer _file_ptr). To scan the row it uses the row description given by the calling function in the input parameter _row_desc. It fills in the "access structure" in the memory area of the calling function (parameter _row_access). For more details, See the internal function _fetch_row. It logs a message when an error occurs.

F8

NAME: _write_row
DESCRIPTION: It logs a message when an error occurs. Input A and B. It inserts a row in a table (the row is appended at the bottom of the file table). It uses the row description given by the calling function as input parameter. It takes the data to be written from the Access Description structure B given by the calling function as input parameter. It opens and close the table file. It checks whether a row with the UNIQUE INDEX already exists in the table.

F9
NAME: __delete__row
DESCRIPTION: It logically deletes a row in a table. The calling function must give the position of the row in the table. It updates the counter of deleted lines.

F10
NAME: __refresh__table__file
DESCRIPTION: It checks, for a specified table, whether the deleted lines counter has reached the threshold or not. If yes, it rewrites the table files without all lines that have been previously logically deleted. The counter is reset to 0 when the threshold is overcome and maintains the same value when the value is less than the threshold.

F11
NAME: __fetch__row
DESCRIPTION: It fetches a table row starting from the current position in the table file (position given by the calling function in the file pointer __file__ptr). To scan the row it uses the row description given by the calling function in the input parameter __row__desc. It fills in the "access structure" in the memory area of the calling function (parameter __row__access). It gets from the calling function the table name (parameter __table__name) and the row number (parameter __row__nbr) that are inserted in the error messages. If no error occurs, the scanning terminates at the end-of-line after the last column. Otherwise, the scanning is aborted when the first error is detected. It assumes the initial value of the file pointer is pointing to char immediately after the special char initiating the row.

Last char got from the file:
end-of-line terminating the last (or the unique) line composing the row (fetching successfully terminated),
column terminator of the last column fetched or bad char initiating a line or unexpected end-of-line or unexpected end-of-file (fetching aborted).
It logs a message when an error occurs.

The described method of emulating an SQL relational-database in order to simplify the porting of an existing application toward a destination equipment is felt to have considerable advantages in terms of memory and CPU time saving.

I claim:

1. A method of providing SQL relational-database functions to an application (An), comprising the following steps:
    converting SQL statements assigned to a restricted subset of SQL relational-database functions into interface functions (IF1 to IFn), which invokes depending on the respective SQL statement a sequence of predefined emulation library functions (LF1 to LFm) accessing user data, and
    building, from a modular set of said interface functions (IF1 to IFn) and respective predefined emulation library functions (LF1 to LFm), data management routines implementing only said restricted subset of SQL functions.

2. A method as claimed in claim 1, wherein said emulation library functions (LF1 to LFm) provide basic operations on ASCII files (AF1 to AFk).

3. A method as claimed in claim 2, wherein said emulation library functions access configuration ASCII files including database and tables definitions and ASCII user data files including the user data.

4. A method as claimed in claim 1, wherein access to the user data is handled by an encryption/decryption module (M3).

5. Method for porting an existing application (An) using an SQL relational database toward reduced hardware configuration equipment (HW2), comprising the following steps:
    converting SQL statements assigned to a restricted subset of SQL relational-database functions into interface functions (IF1 to IFn), which invokes depending on the respective SQL statement a sequence of predefined emulation library functions (LF1 to LFm) accessing user data, and
    building, from a modular set of said interface functions (IF1 to IFn) and respective predefined emulation library functions (LF1 to LFm), data management routines implementing only said restricted subset of SQL functions, and
    installing said data management routines as SQL emulator for said application (An) on the reduced hardware configuration (HW2).

6. A method as claimed in claim 5, wherein the restricted subset of SQL functions is configured and reduced or increased as needed by the existing application (An).

7. Emulator (1) for providing of SQL relational-database functions to an application (An) containing
    an interface module (M1) formed by a set of interface function modules (IF1 to IFn) each activated by a specific SQL statement, and
    an emulation library (M2) formed by a set of emulation library functions modules (LF1 to LFm) providing predefined emulation library functions for accessing user data; wherein
    each interface function module (IF1 to IFn) is designed in such a way that it invokes depending on the respective SQL statement the execution of a sequence of emulation library functions and by this implements data management routines for the respective SQL statement, and wherein
    the interface module (M1) and the emulation library (M2) contain a restricted number of said interface function modules (IF1 to IFn) and library function modules (LF1 to LFn), respectively, for implementing only a restricted subset of SQL functions.

8. Emulator as claimed in claim 7, wherein the emulation library (M2) contains library functions modules (LF1 to LFn)
    for creating SQL tables and defining fields,
    for storing, modifying and deleting data on created tables, where a type check is performed according to the field definition, and
    for retrieving such data by using SQL filters.

* * * * *